Figure 1:
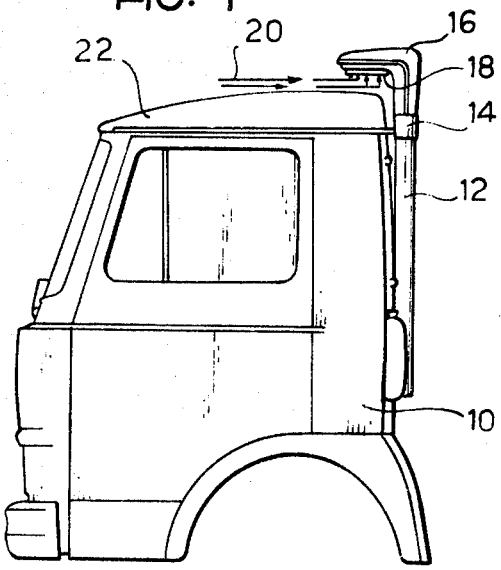

United States Patent [19]

Magrini

[11] 4,212,659
[45] Jul. 15, 1980

[54] AIR-INTAKE DEVICES FOR INTERNAL COMBUSTION ENGINES

[75] Inventor: Guido Magrini, Brescia, Italy
[73] Assignee: Fiat Veicoli Industriali S.p.A., Turin, Italy
[21] Appl. No.: 967,457
[22] Filed: Dec. 7, 1978
[30] Foreign Application Priority Data
Dec. 30, 1977 [IT] Italy ................ 69963 A/77
[51] Int. Cl.² ........................................ B01D 50/00
[52] U.S. Cl. .................................. 55/385 B; 55/185; 55/396; 55/440
[58] Field of Search ............ 55/183, 185, 186, 385 B, 55/440, 461, 465, 396, 443, 444

[56] References Cited
U.S. PATENT DOCUMENTS 3,791,112  2/1974  Lidstone ........................... 55/385 B
3,987,862  10/1976  Lidstone ......................... 55/385 B X
4,035,171  7/1977  Reed et al. ......................... 55/186 X Primary Examiner—Charles N. Hart
Assistant Examiner—Richard W. Burks
Attorney, Agent, or Firm—Sughrue, Rothwell, Mion, Zinn and Macpeak

[57] ABSTRACT

Air-intake device for internal combustion engines in which the inlet end of an induction conduit is inserted into a hollow casing having a downward facing intake aperture in which a series of parallel baffle plates, by means of curved downstream end portions, deflect the induced air away from the inlet causing water droplets to collect on the casing roof and fall by gravity into annular water traps which have water discharge openings. The intake aperture is surrounded by an annular skirt, the upstream edge of which forms a drip-edge.

1 Claim, 2 Drawing Figures

AIR-INTAKE DEVICES FOR INTERNAL COMBUSTION ENGINES

The present invention relates to air-intake devices for internal combustion engines.

More particularly the present invention is concerned with an air intake device for communication with an induction conduit which supplies air to an engine from an air intake of the device.

It is known that the air inducted for combustion in an internal combustion engine must be as free as possible from impurities, particularly solid particles such as, for example, dust or sand and liquids, for example, water droplets. The solid particle impurities are easily eliminated by filters placed in the induction conduit or at the entrance thereto. The elimination of water droplets, however, is more difficult, especially when the vehicle is used in wet weather.

The object of the present invention is to provide an air-intake device of the above specified type having means to separate water from the inducted air.

According to the present invention there is provided an air-intake of the aforesaid type, characterised in that an inlet end of the induction conduit communicates with a hollow casing having at least one intake aperture in which is mounted a plurality of baffle plates, the downstream end portions of which, within the casing, are directed away from the said inlet end of the induction conduit.

In the preferred embodiment a lower portion of the casing, in the installed device, has at least one water-trap which opens upwardly into the interior of the casing and is in communication with the exterior through at least one water discharge opening.

Preferably, the intake aperture in the casing is open downwardly in the installed position of the device.

The present invention has the advantage of being effective in separating water droplets from inducted air, while also being simple to manufacture and easy to assemble. The invention is particularly suitable for industrial vehicles in which the air-intake device may be situated above the roof of the driver's cab.

Figure 2:
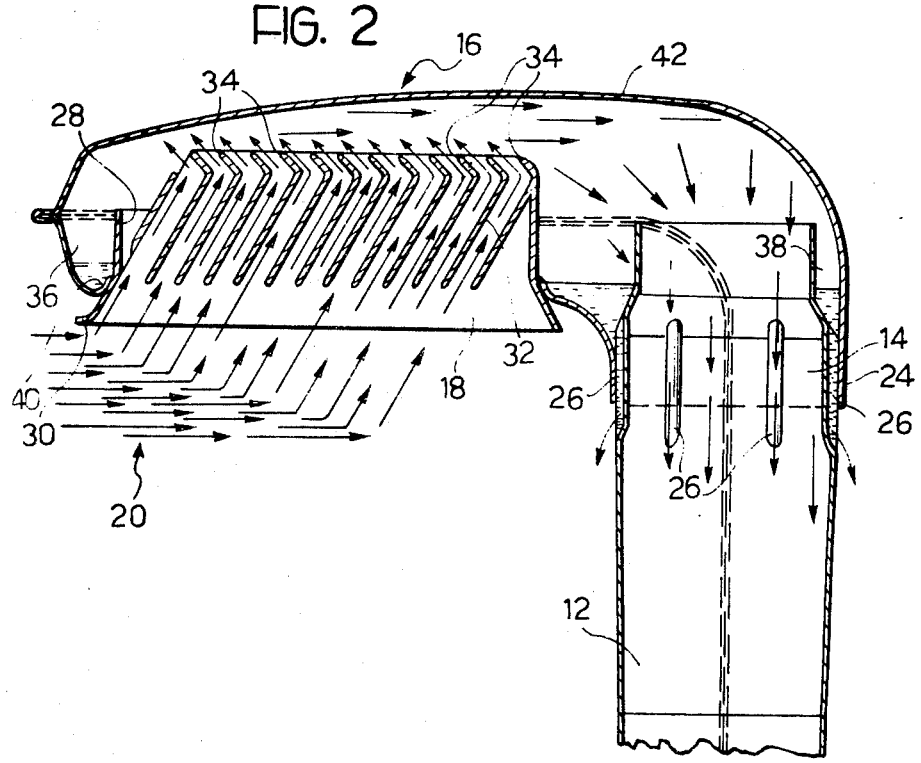

One embodiment of the invention will now be more particularly described, by way of example, with reference to the accompanying drawings, in which:

FIG. 1 is a side view of the driver's cab of an industrial vehicle having an air-intake device according to the present invention; and FIG. 2 is a diagrammatic longitudinal section, on an enlarged scale, of the air-intake device illustrated in FIG. 1, taken on the longitudinal centreline of the vehicle cab.

As shown in FIG. 1, a tubular induction conduit 12 is mounted behind the driver's cab 10 of an industrial vehicle, connected to the engine (not shown) of the vehicle. The conduit 12 has a tubular air inlet end 14 which is inserted into a hollow casing 16 formed from metal or plastics material. The casing 16 has an intake aperture 18, opening downwardly over the roof 22 of the driver's cab 10, for induction of air 20, possibly laden with water droplets.

As shown in FIG. 2, the hollow casing 16 has a tubular portion 24 which is fixed over the tubular inlet end of the induction conduit 12. The inlet end 14 is formed with a series of vertical indented grooves 26 distributed about its perimeter.

The intake aperture 18 is surrounded by an annular skirt 28, the upstream edge of which is formed as an outwardly turned drip-edge 30. The intake aperture 18 is provided with a series of transverse baffle plates 32, preferably parallel to one another, the downstream (upper) end portions 34 of which are directed away from the inlet end 14 of the induction conduit 12 so as to deflect incoming water droplets or solid particles towards the roof 42 of the casing 16.

Inside the hollow casing 16, the intake aperture 18 is surrounded by a first annular water-trap 36, and the inlet end 14 of the induction conduit 12 is surrounded by a second annular water-trap 38. The two annular water traps 36 and 38 are intercommunicating, having a substantially figure-of-eight configuration in plan. The front part of the first annular trap 36 communicates with the exterior through a first water discharge opening 40, while the rear part of the first trap 36 and the second trap 38 communicate with the exterior through a series of second water discharge openings formed by the vertical grooves 26.

The operation of the device is as follows: the air 20 is inducted into the intake aperture 18 and passes through the channels formed by the baffle plates 32. The curved downstream end portions 34 of the baffle plates 32 cause a deflection of the air towards an area of the interior of the casing 16 confined by that part of the casing roof 42 which slopes away from the tubular intake 14 of the induction conduit 12. This causes the water droplets to separate from the inducted air 20 and collect on the inside of the casing roof 42, while the air, from which the water has now been separated, continues its flow towards the induction conduit 12. The water droplets collected on the inside of the casing roof 42 fall, by gravity, into the annular traps 36 and 38 from which the collected water is drained continuously through the discharge openings 40 and 26, respectively.

The outwardly turned drip edge 30 of the annular skirt 28 prevents any water discharged from the annular traps 36 being re-inducted with the air 20.

What is claimed is:

1. An air-intake device for an internal combustion engine comprising a vertically disposed induction conduit, a hollow casing having first and second means defining downwardly opening spaced apart intake and outlet apertures, the upper end of said induction conduit being disposed in said outlet aperture in communication with the interior of said casing, a plurality of baffle plates mounted in said intake aperture and having downstream end portions within said casing directed away from said outlet aperture, first annular water trap means surrounding said intake aperture and second annular water trap means surrounding said upper end of said induction conduit extending into said outlet aperture and means for draining said first and second water trap means.

* * * * *